L. GILSON.
Hand-Truck.
No. 6,267. Reissued Feb. 2, 1875.
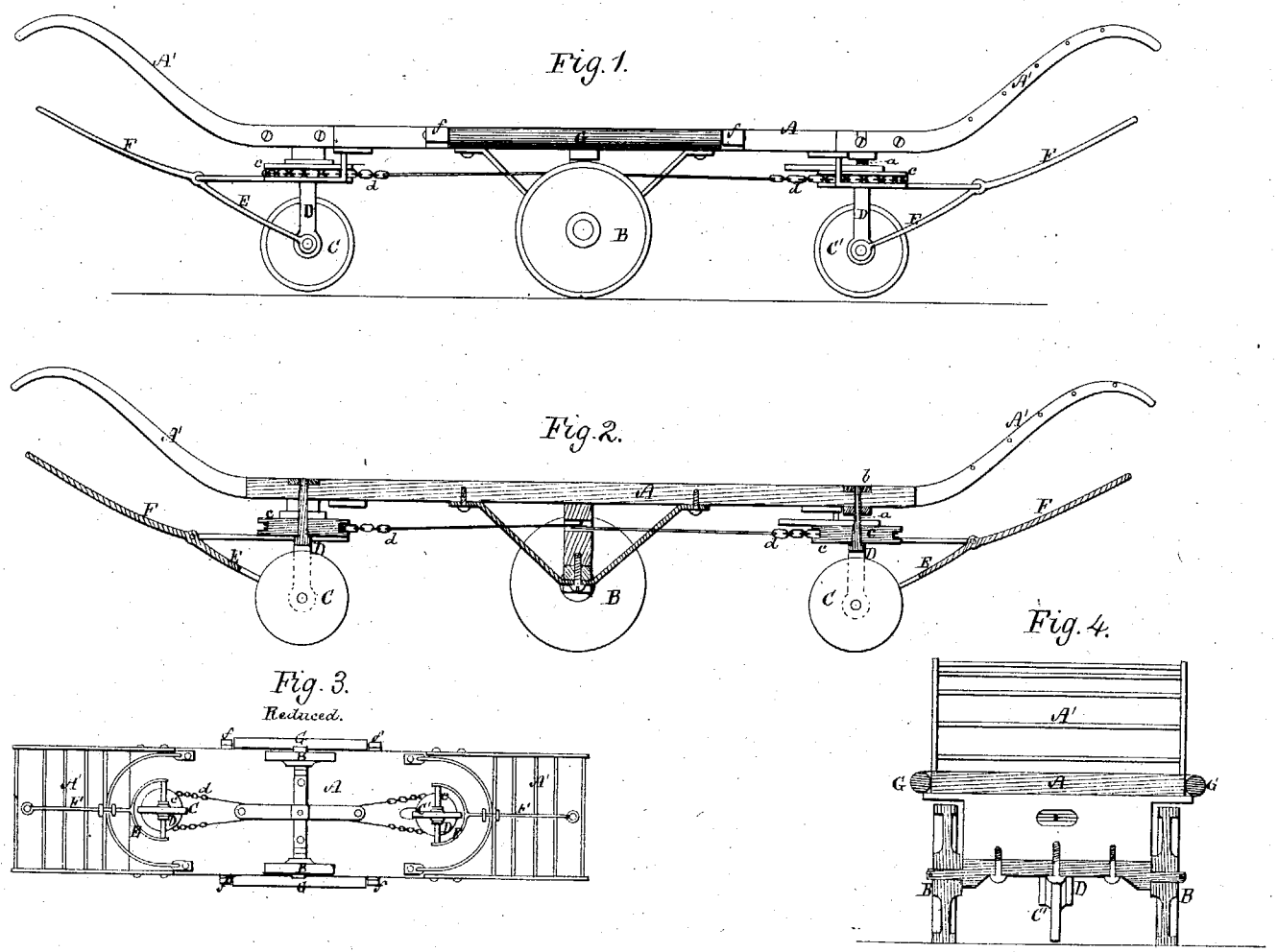
WITNESSES.
W. A. Bassett.
H. C. Boardman.
Leonard Gilson.
Y. Curtis. Att'y.

UNITED STATES PATENT OFFICE.

LEONARD GILSON, OF BOSTON, MASSACHUSETTS.

IMPROVEMENT IN HAND-TRUCKS.

Specification forming part of Letters Patent No. 134,537, dated January 7, 1873; reissue No. 6,267, dated February 2, 1875; application filed December 9, 1874.

*To all whom it may concern:*

Be it known that I, LEONARD GILSON, of Boston, Suffolk county, Massachusetts, have invented certain Improvements in Hand-Trucks, of which the following is a specification:

These improvements relate more or less closely to a class of variable or universal trucks for use in and about railway-depots, stores, warehouses, &c., such as is shown and described in Letters Patent of the United States issued to me on the 19th day of July, 1870.

Although sufficiently described in my said Letters Patent, I may here state that the invention therein shown consists, among other devices, in the employment and arrangement of three wheels or sets of wheels, disposed below the platform of the truck under such an arrangement that I am enabled to obtain a bearing upon the floor of all the wheels, or of any two of them, in order that the platform may assume a sloping position in either direction, according to the disposition of the load upon it, and in this manner be trundled upon two of its sets of wheels, or turned about in a circle, in order to change its direction with ease and celerity when carrying a heavy load, which cannot be done with the present four-wheeled depot baggage-truck.

By my arrangement of wheels, as shown in said Letters Patent, I obtain all the advantages of a single or two wheeled hand-truck, in that it may be tilted into a sloping position in either direction, in order to receive a load from different elevations, or enable merchandise to be tipped over upon it, while at the same time I retain the great carrying capacity and ease of propulsion of the present four-wheeled baggage-truck now universally in use in railway-stations.

My present improvement consists, first, in attaching any one or all the wheels or sets of wheels in an adjustable manner to the truck-platform, whereby the extent of inclination of such platform may be varied at pleasure, to accommodate the various elevations at which loads are to be received, or to enable the entire series of wheels to bear and roll upon the floor, should this be desired; and, secondly, the improvements herein embodied consist in swiveling the end wheel or wheels or their supports horizontally within the platform, and connecting the two together by diagonally-crossed rods, as hereinafter stated, in order that the attendant, by means of the handle attached to each, may change the direction of both simultaneously when the truck is to be rotated upon its center wheels, this connection of the end wheels being of service more especially when the entire series of wheels are bearing upon the floor.

The drawing accompanying this specification represents, in Figure 1, a side elevation, in Fig. 2 a longitudinal section, in Fig. 3 an under-side view, and in Fig. 4 a transverse central section, of a truck embodying my present improvements.

In the drawing, A denotes a flat platform, provided at each end with sloping grating A′, for retaining in place the baggage which may be piled upon such platform, and by which the position of the truck may be varied, or by which it may be trundled along the floor, in lieu of or in addition to the handles to be hereinafter described.

To the under side of the platform A, and about equidistant between its ends, and preferably inside of its outer edge, I mount two wheels, B B, these wheels constituting the primary supporting-wheels of the truck, and revolving independently of each other, in order that the truck may be permitted to easily describe a circle or part of a circle upon its own center. The two end wheels or casters of the truck are shown at C C′, respectively, as disposed at opposite ends of the platform A, and each mounted within a furcated foot or standard, D, which is provided with a bail, E, and handle F, the latter of which extends outwardly beneath and below one grating, A′, and into a position to be readily seized by the attendant. By means of these handles the truck is trundled along and its direction changed at pleasure.

Each foot or support D is swiveled within or to the under side of the platform A, in order that it may rotate easily upon its pivot when it becomes desirable to change the direction traveled by the truck, and one or either of such feet is applied in an adjustable manner to the platform, in order that the height of the wheel carried by it may be varied in relation to the others, the platform, and the floor.

To accomplish elevation or depression of the foot, its upper part may be swiveled within or upon a rod or stud, *a*, which stud is screwed into the platform, or a metallic plate, *b*, affixed thereto, as shown in Fig. 2 of the drawing; or the same result may be arrived at in various ways, as I do not confine myself to any given method.

It may also be found desirable, under some circumstances, to mount the center wheels adjustably; but this is of doubtful utility.

To the upper part of each foot or standard D, whether the same is adjustable vertically or not, I affix a grooved disk or pulley, *c*, and around the peripheries of these pulleys I pass an endless chain or cord, *d*, or the equivalent thereof, this chain being crossed diagonally, as shown in Fig. 3 of the drawing, in order that when one end wheel is turned upon its pivot the opposite wheel shall assume the same position.

As the purpose in changing each end wheel from a position parallel to the longest plane of the platform to one at right angles thereto is to enable the truck to be turned in a circle, it is not necessary that the connecting-chain *d* should be crossed; but I prefer to so arrange it in order that the handles F shall be situated at one and the same side of the platform.

By attaching one or both end wheels C or C′ adjustably to the platform, I am enabled to vary accordingly the angle of slope of the platform, by which means either end of the platform may be made closely to approach the floor for ease in loading, and also enable the truck to be trundled along with its load disposed upon one side of its center. By means of the adjustable arrangement of the end wheels, I am enabled to cause each to bear upon the floor, and thus support the weight of the load upon all of the wheels, when desired; and in case this should be done, it is important that the end wheels should be susceptible of a change in position, as before stated, to enable the truck to be turned upon its center.

G in the accompanying drawing represents a long roller, mounted and freely revolving within suitable boxes or supports *f f*, applied to each side of the platform A, the said roller being situated immediately adjacent to the edge of the platform, as shown in Figs. 3 and 4, and with the upper surface of the two about in the same horizontal plane, the length of the roller, with respect to that of the platform, being guided by necessity or circumstances.

The roller G may be applied to the ends of the platform as well as the sides by removing the gratings A′, and in either position will constitute a means of enabling a heavy or bulky object to be raised and deposited upon the platform with ease and celerity.

The swiveled wheel at one end of the truck may be dispensed with in order to produce a single truck, the main wheels B being placed at or near the said end of the truck, and the remaining swiveled wheel left free to turn independently on its own axis.

I claim—

1. In a hand-truck, the combination, with central primary wheels, of end wheels, adjustable in altitude with respect to one another and the floor or platform of the truck, substantially as and for the purposes set forth.

2. In combination with the central primary wheels of a hand-truck, end wheels adjustable vertically and swiveled to turn on a vertical axis, substantially as and for the purposes set forth.

3. In a hand-truck, the combination, with a primary or main wheel or wheels, of a swiveled end wheel or wheels, substantially as and for the purposes set forth.

LEONARD GILSON.

Witnesses:
F. CURTIS,
W. E. BOARDMAN.